(12) United States Patent
Lee et al.

(10) Patent No.: US 10,886,066 B2
(45) Date of Patent: Jan. 5, 2021

(54) MULTILAYER CERAMIC CAPACITOR INCLUDING EXTERNAL ELECTRODE HAVING TIN-PLATED LAYERS ALTERNATELY STACKED WITH NICKEL-PLATED LAYER(S)

(71) Applicant: SAMSUNG ELECTRO-MECHANICS CO., LTD., Suwon-si (KR)

(72) Inventors: Jong Ho Lee, Suwon-si (KR); Eui Hyun Jo, Suwon-si (KR); Jang Yeol Lee, Suwon-si (KR); Myung Jun Park, Suwon-si (KR); Hyun Hee Gu, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 158 days.

(21) Appl. No.: 16/171,903

(22) Filed: Oct. 26, 2018

(65) Prior Publication Data

US 2020/0006001 A1    Jan. 2, 2020

(30) Foreign Application Priority Data

Jun. 29, 2018    (KR) .......................... 10-2018-0075286

(51) Int. Cl.
*H01G 4/232* (2006.01)
*H01G 4/30* (2006.01)
(Continued)

(52) U.S. Cl.
CPC .......... *H01G 4/2325* (2013.01); *H01G 4/248* (2013.01); *H01G 4/30* (2013.01); *H01G 4/012* (2013.01); *H01G 4/1227* (2013.01)

(58) Field of Classification Search
CPC ........ H01G 4/2325; H01G 4/30; H01G 4/012; H01G 4/1227; H01G 4/248
See application file for complete search history.

(56) References Cited

U.S. PATENT DOCUMENTS

2012/0288724 A1* 11/2012 Ogawa ..................... H01G 4/30
428/457
2014/0204502 A1    7/2014 Chun et al.
(Continued)

FOREIGN PATENT DOCUMENTS

JP    2003-229192 A    8/2003
JP    2007-177311 A    7/2007
(Continued)

OTHER PUBLICATIONS

Korean Office Action dated Nov. 6, 2019 issued in Korean Patent Application No. 10-2018-0075286 (with English translation).
(Continued)

*Primary Examiner* — David M Sinclair
(74) *Attorney, Agent, or Firm* — Morgan, Lewis & Bockius LLP

(57) ABSTRACT

A multilayer ceramic capacitor includes a body and an external electrode on the body. The body includes a dielectric layer and an internal electrode. The external electrode includes an electrode layer connected to the internal electrode, a first plating portion on the electrode layer, and a second plating portion on the first plating portion. The first plating portion includes a plurality of plating layers in which a tin (Sn)-plated layer and a nickel (Ni)-plated layer are alternately stacked.

26 Claims, 4 Drawing Sheets

(51) Int. Cl.
*H01G 4/12* (2006.01)
*H01G 4/248* (2006.01)
*H01G 4/012* (2006.01)

(56) References Cited

U.S. PATENT DOCUMENTS

| | | | |
|---|---|---|---|
| 2014/0321025 A1 | 10/2014 | Saito et al. | |
| 2015/0016019 A1* | 1/2015 | Chae | H01G 4/2325 |
| | | | 361/301.4 |
| 2016/0268046 A1 | 9/2016 | Nishisaka et al. | |
| 2016/0276106 A1 | 9/2016 | Kuroiwa et al. | |
| 2017/0330689 A1* | 11/2017 | Hatanaka | H01G 4/30 |
| 2018/0108483 A1 | 4/2018 | Sasabayashi et al. | |

FOREIGN PATENT DOCUMENTS

| | | | |
|---|---|---|---|
| JP | 2010242117 A | * | 10/2010 |
| JP | 2018-67568 A | | 4/2018 |
| KR | 10-2014-0095361 A | | 8/2014 |
| KR | 10-2014-0106733 A | | 9/2014 |
| KR | 10-2016-0112972 A | | 9/2016 |
| KR | 10-1800212 B1 | | 11/2017 |
| KR | 10-1831322 B1 | | 2/2018 |

OTHER PUBLICATIONS

Office Action issued in corresponding Korean Application No. 10-2018-0075286, dated May 17, 2019.

* cited by examiner

MULTILAYER CERAMIC CAPACITOR INCLUDING EXTERNAL ELECTRODE HAVING TIN-PLATED LAYERS ALTERNATELY STACKED WITH NICKEL-PLATED LAYER(S)

CROSS-REFERENCE TO RELATED APPLICATION(S)

This application claims benefit of priority to Korean Patent Application No. 10-2018-0075286 filed on Jun. 29, 2018 in the Korean Intellectual Property Office, the disclosure of which is incorporated herein by reference in its entirety.

BACKGROUND

1. Field

The present disclosure relates to a multilayer ceramic capacitor.

2. Description of Related Art

A multilayer ceramic capacitor (MLCC) is an important chip component used in industrial fields such as communications, computing, electronic appliance manufacturing, vehicle manufacturing, and others. Multilayer ceramic capacitors are small-sized, can secure high capacity, and can be easily installed. Multilayer ceramic capacitors are also a core passive element used in a variety of electric devices, such as cellular phones, computers, digital TVs, and the like.

Recently, there has been an increased demand for mobile devices, wearable devices, and the like, and it has been important to secure moisture resistance reliability in multilayer ceramic capacitors to allow for their use in diverse climates and environments.

Generally, moisture resistance reliability is secured by forming an Ni-plated layer and an Sn-plated layer on an electrode layer of an external electrode of a multilayer ceramic capacitor. However, when using the general plating method, there have been problems such as discontinuation of plating, due to discontinuation of the electrode layer, a glass beading phenomenon, in which glass included in an electrode layer protrudes externally, and the like. The portion where plating is not formed becomes a route for moisture penetration, which can degrade moisture resistance reliability.

SUMMARY

An aspect of the present disclosure is to provide a multilayer ceramic capacitor with excellent moisture resistance reliability by preventing plating discontinuation.

According to an aspect of the present disclosure, a multilayer ceramic capacitor includes a body and an external electrode on the body. The body includes a dielectric layer and an internal electrode. The external electrode includes an electrode layer connected to the internal electrode, a first plating portion on the electrode layer, and a second plating portion on the first plating portion. The first plating portion includes a plurality of plating layers in which a tin (Sn)-plated layer and a nickel (Ni)-plated layer are alternately stacked.

According to another aspect of the present disclosure, a multilayer ceramic capacitor includes a body and an external electrode on the body. The body includes a dielectric layer and an internal electrode. The external electrode includes an electrode contacting the internal electrode, a first plating portion on the electrode layer, and a second plating portion on the first plating portion. The first plating portion includes a plurality of plating layers in which a tin (Sn)-plated layer and a nickel (Ni)-plated layer are alternately stacked. A tin-nickel (Sn—Ni) intermetallic compound layer at an interfacial area between the tin (Sn)-plated layer and the nickel (Ni)-plated layer of the first plating portion.

According to another aspect of the present disclosure, a multilayer ceramic capacitor includes a body and an external electrode on the body. The body includes a dielectric layer and an internal electrode. The external electrode includes an electrode layer in contact with the internal electrode. A first plating portion is on the electrode layer and includes tin (Sn), nickel (Ni), and a tin-nickel (Sn—Ni) intermetallic compound. A second plating portion is on the first plating portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
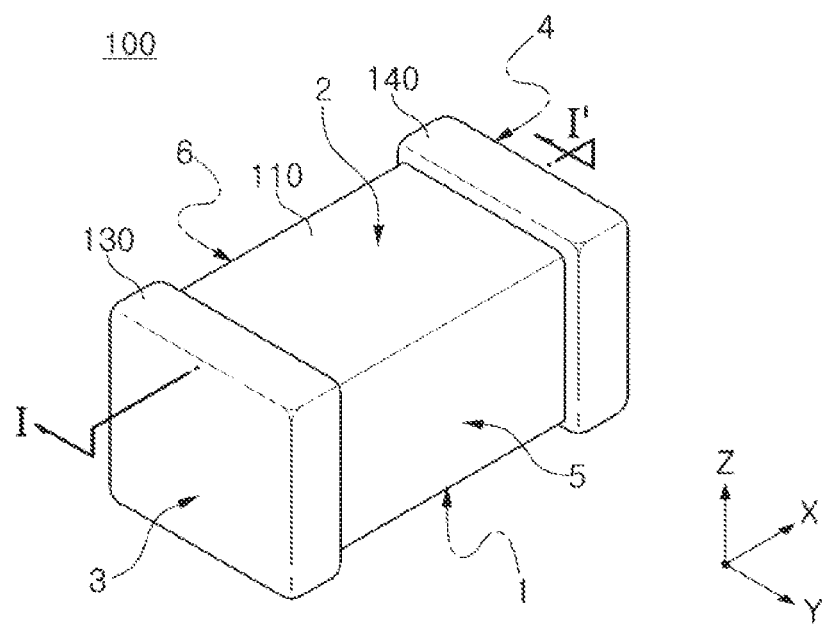
FIG. 1 is a schematic perspective view of a multilayer ceramic capacitor according to the exemplary embodiments in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clear description. Also, elements having the same function within the scope of the same concept represented in the drawing of each exemplary embodiment will be described using the same reference numeral.

Figure 2:
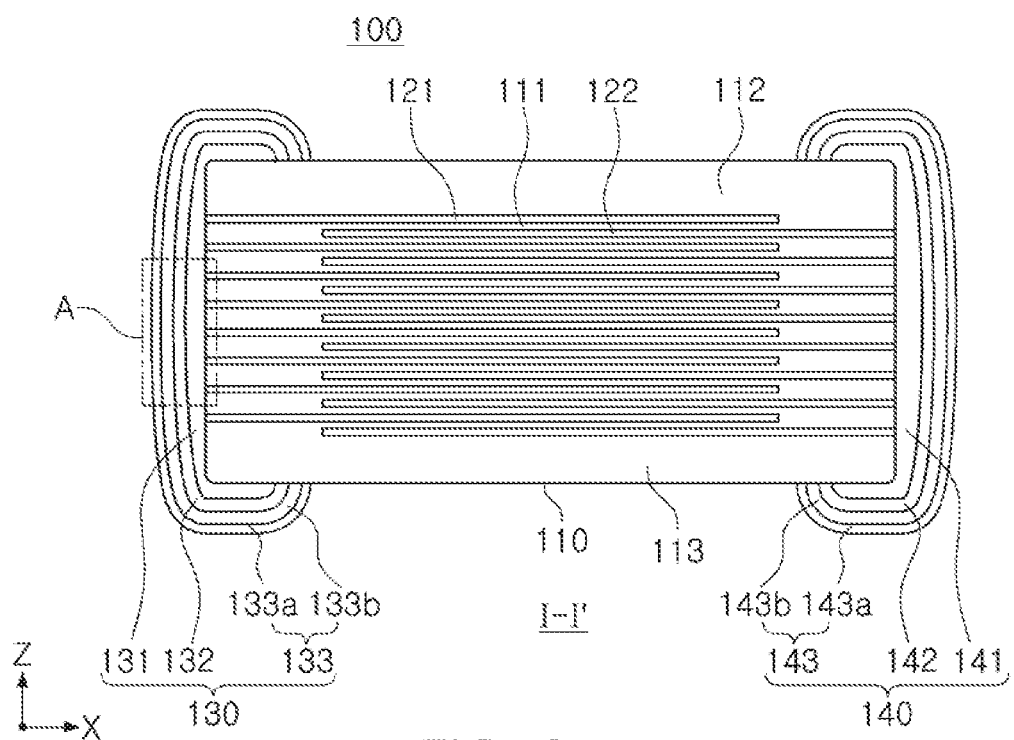
FIG. 2 is a cross-sectional view taken along line I-I' in FIG. 1.
Figure 3A:
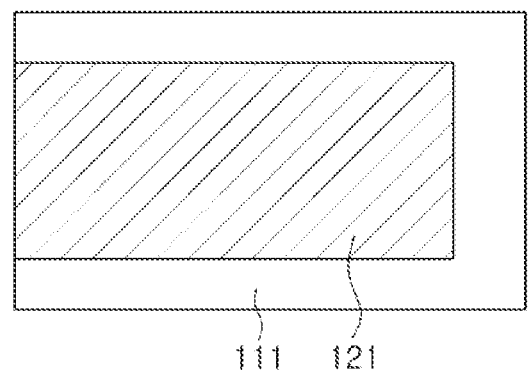
FIGS. 3A and 3B are plan views of ceramic green sheets on which internal electrodes are printed to manufacture a body of a multilayer ceramic capacitor.
Figure 3B:
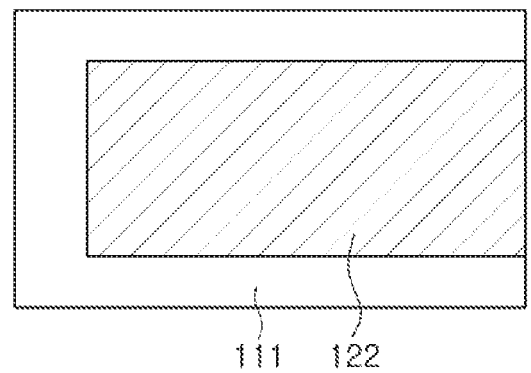

FIG. 1 is a schematic perspective view of a multilayer ceramic capacitor according to first through fourth exemplary embodiments. FIG. 2 is a cross-sectional view taken along line I-I' in FIG. 1. FIGS. 3A and 3B are views of ceramic green sheets on which internal electrodes are printed to manufacture a body of a multilayer ceramic capacitor.

Referring to FIGS. 1 to 3B, a multilayer ceramic capacitor 100 according to an exemplary embodiment may include a body 110 and external electrodes 130 and 140.

The body 110 may include an active area that contributes to capacity formation of a capacitor. The body 110 may also include an upper cover 112 and a lower cover 113, which are upper and lower margin parts formed on upper and lower parts of the active area, respectively.

In the exemplary embodiment, the body 110 may be hexahedral, but is not limited thereto.

The body 110 may not be exactly hexahedral and may be close to a hexahedron, due to thickness differences caused by disposition of internal electrodes and edge polishing.

To clearly describe the exemplary embodiments, in the drawings, the direction of the body may be discussed in relation to a first, length direction (illustrated as the "X" direction), a second, width direction (illustrated as the "Y" direction), and third, thickness (or stacking) direction (illustrated as the "Z" direction).

Surfaces of the body 110 include first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first through fourth surfaces and opposing each other in the Y direction. The first surface 1 may be a mounting surface.

The active area may be formed as a structure in which a plurality of first and second internal electrodes are alternately stacked with dielectric layers being interposed therebetween. Referring to FIGS. 3A and 3B, the body 110 may be formed by alternately stacking ceramic green sheets on which first internal electrodes 121 are printed (FIG. 3A) and ceramic green sheets on which second internal electrodes 122 are printed (3B) and sintering the stacked ceramic green sheets.

The plurality of dielectric layers 111 forming the body 110 are in a sintered state. The dielectric layers 111 may be integrated such that boundaries between adjacent dielectric layers 111 may be difficult to identify without using a scanning electron microscope (SEM).

The material of the dielectric layers 111 is not particularly limited as long as sufficient capacitance can be obtained with the use thereof. For example, the dielectric layers 111 may include barium titanate (BaTiO3) power or strontium titanate (SrTiO3) power, but are not limited thereto. Various ceramic additives, organic solvents, coupling agents, dispersing agents, and the like, may be added in addition to barium titanate (BaTiO3) powder, or the like.

The thickness of each of the dielectric layers 111 may be selected in accordance with the desired capacitance of the multilayer ceramic capacitor 100. The thickness of a single dielectric layer 111 may be within a range of 0.1 to 10 μm after sintering, but is not limited thereto.

The first internal electrodes 121 may face the second internal electrodes 122, with one or more dielectric layers 111 interposed between the first and second internal electrodes.

The first and second internal electrodes 121 and 122 may be a pair of electrodes having different polarities. The first and second internal electrodes 121 and 122 may be formed by printing conductive paste, including a conductive metal, to a certain thickness on the dielectric layer 111, with the dielectric layer 111 interposed therebetween. The first and second internal electrodes 121 and 122 may be alternately exposed at the third and fourth surfaces 3 and 4 of the body 110, in a stacking direction of the dielectric layer 111. The first and second internal electrodes 121 and 122 may be insulated electrically from each other by the dielectric layer 111 therebetween.

The first internal electrodes 121 may be electrically connected to a first external electrode 130 through an electrode layer 131 on the third surface 3 of the body 110. The second internal electrodes 122 may be electrically connected to a second external electrode 140 through an electrode layer 141 on the fourth surface 4 of the body 110.

When voltage is applied to the first and second external electrodes 130 and 140, charge can be accumulated between the first and second internal electrodes 121 and 122 facing each other, and the capacitance of the multilayer ceramic capacitor 100 may be proportionate to the area of overlap between the first and second internal electrodes 121 and 122.

The thickness of the first and second internal electrodes 121 and 122 may be determined depending on the intended use. For example, the thickness of the first and second internal electrodes 121 and 122 may be within a range of 0.2 to 1.0 μm based on the desired size and capacity of the ceramic body 110. However, the thickness of the first and second internal electrodes 121 and 122 is not limited thereto.

The conductive metal included in the first and second internal electrodes 121 and 122 may be nickel (Ni), copper (Cu), palladium (Pd) or an alloy thereof, but is not limited thereto.

Upper and lower covers 112 and 113 may lack internal electrodes and thereby differ from the active area. Upper and lower covers 112 and 113 may have the same material and composition as the dielectric layers 111 of the active area.

The upper and lower covers 112 and 113 may be formed by layering one or more dielectric layers on the upper and lower surfaces of the active area in the Z direction. The upper and lower covers 112 and 113 may serve to prevent damage to the first and second internal electrodes 121 and 122 caused by a physical or chemical stress, for example.

The first and second external electrodes 130 and 140 may respectively include electrode layers 131 and 141, first plating portions 132 and 142, and second plating portions 133 and 143.

The first and second external electrodes 130 and 140 may each extend onto portions of the first and second surfaces 1 and 2 of the body 110. The first and second external electrodes 130 and 140 may also each extend to portions of the fifth and sixth surfaces 5 and 6 of the body 110.

The electrode layers 131 and 141 may connect the body 110 and the external electrodes 130 and 140 mechanically, and connect the internal electrodes 121 and 122 to the external electrodes 130 and 140 electrically and mechanically.

The method of forming the electrode layers 131 and 141 is not particularly limited. The electrode layers 131 and 141 may be sintered electrodes formed by using a paste including a conductive metal and glass, or may be a resin electrode formed by using a paste including a conductive metal and a base resin. The electrode layers 131 and 141 may also be formed by an electroless plating method, a sputtering process, or an atomic layer deposition method.

When the electrode layers 131 and 141 are sintered electrodes including conductive metal and glass, it is highly likely that, if a general plating method is used, the plating will be discontinuous due to disconnection of an electrode layer, a glass beading phenomenon in which glass included in an electrode layer protrudes externally, or the like. Thus, when the electrode layers are sintered electrodes, a moisture resistance reliability effect may be prominent according to the present disclosure described below.

A sintered electrode including a conductive metal and glass may be formed by applying paste including the conductive metal and glass to be sintered.

The glass may serve to bond the body 110 and the external electrodes 130 and 140 mechanically, and the conductive metal may serve to bond the internal electrodes 121 and 122 and the external electrodes 130 and 140 electrically and mechanically. The conductive metal may be Cu.

FIGS. 4, 5, 6, and 7 are magnified views of part A in FIG. 2 according to first, second, third, and fourth exemplary embodiments, respectively.

Part A is includes a portion of the first external electrode 130 electrically connected to the first internal electrodes 121. The configuration of the first external electrode 130 may be similar to that of the second external electrode 140, with the only difference being that the second external electrode 130 is connected to the second internal electrodes 122. The exemplary embodiments will be described with reference to the first external electrode 130, with the description also applicable to the second external electrode 140.

In the description below, a first plating portion and a second plating portion will be described in greater detail in accordance with the first and second exemplary embodiments with reference to FIGS. 4 and 5.

Figure 4:
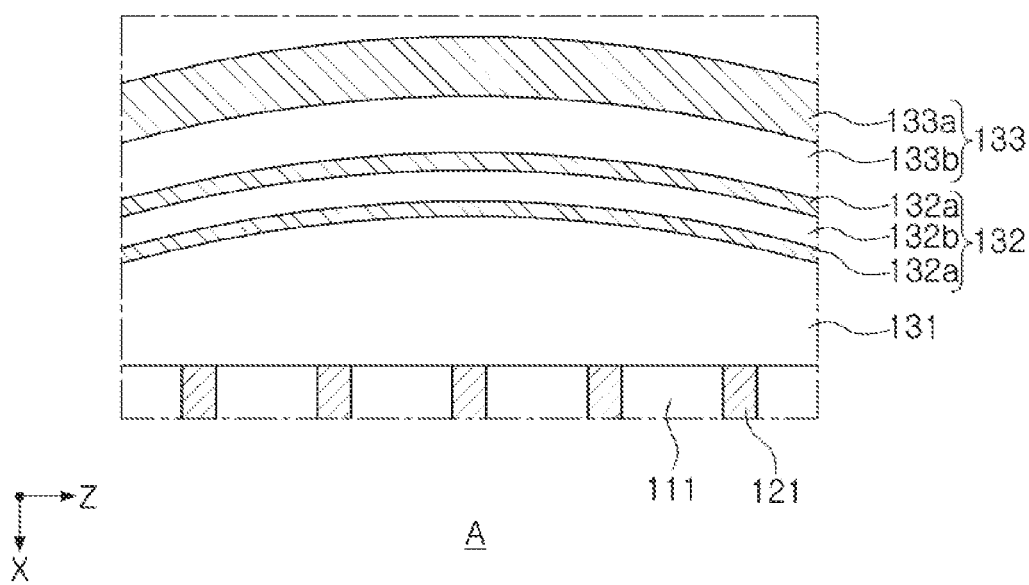
FIG. 4 is a magnified view of part A in FIG. 2 according to a first exemplary embodiment in the present disclosure.

Referring to FIG. 4, the first plating portion 132 may include a plurality of plating layers in which a tin (Sn)-plated layer 132a and a nickel (Ni)-plated layer 132b are alternately stacked. The second plating portion 133 may be a conventional plating layer and include a Ni-plated layer 133b and a Sn-plated layer 133a (the second plating portion 143 similarly may include a Ni-plated layer 143b and a Sn-plated layer 143a).

As shown in the first plating portion 132 in FIG. 4, a plating layer of an external electrode of a multilayer ceramic capacitor may generally consist of Ni-plated layer 132b and Sn-plated layer 132a on the Ni-plated layer 132b. The plating layer may be formed by sequentially plating Ni and Sn on the electrode layer 131.

Conventional plating layers may have a problem of plating discontinuation due to disconnection of an electrode layer or a glass beading phenomenon in which glass included in the electrode layer protrudes externally. An area of the electrode layer not covered by plating becomes a route for moisture penetration, which may degrade moisture resistance reliability. Plating discontinuation can occur because Sn grows in a horizontal direction when it is plated, whereas Ni grows in a vertical direction when it is plated. Plating discontinuation does not generally occur when plating Sn, because Sn usually grows parallel to the surface of a body such that the Sn covers the surface of the body. However, Ni usually grows perpendicular to the surface of a body when it is plated, and plating discontinuation may easily occur. When there is a large gap in which Ni is not plated, the plating of Sn may also be discontinuous, even though Sn grows in a horizontal direction.

However, in the present disclosure, the first plating portion 132 includes a plurality of plating layers in which the Sn-plated layer 132a, grown in a horizontal direction, and the Ni-plated layer 132b, grown in a vertical direction, are alternately disposed, and plating discontinuation may thus be prevented.

An alternative was considered where a Sn-plated layer was formed as a pre-plating layer. In this case, the first plating portion could be formed as a Sn-plated layer, with the second plating portion being a conventional plating layer formed on the first plating layer. However, if the first plating portion is only a Sn-plated layer as a pre-plating layer, then the Sn-plated layer may need to achieve a certain minimum thickness. But increasing the thickness of the Sn-plated layer may decrease the coherence between the first plating portion and the electrode layer, and may also cause the Sn to agglomerate in the process of reflow when the multilayer ceramic capacitor is joined to a substrate. Reflow may refer to the process of melting solder through a heat treatment to form an electric contact between a substrate and the multilayer ceramic capacitor such that the multilayer ceramic capacitor may be stably joined to the substrate.

In the present disclosure, the first plating portion 132 may be formed by alternately disposing the Sn-plated layer 132a and the Ni-plated layer 132b. Plating discontinuation of the second plating portion 133 may also be prevented by forming the second plating portion 133, which is a conventional plating layer, on the first plating portion 132. Having a structure in which a Sn-plated layer 132a is alternately stacked with a Ni-plated layer 132b may also prevent agglomeration of Sn during reflow.

The plating layer of the first plating portion in contact with the electrode layer may be a Sn-plated layer. As the Sn-plated layer grows on the electrode layer in a horizontal direction, the electrode layer may be plated without discontinuation.

As illustrated in FIG. 4, the first plating portion 132 may consist of a first Sn-plated layer 132a, a Ni-plated layer 132b, and a second Sn-plated layer 132a sequentially disposed on the electrode layer.

Figure 5:
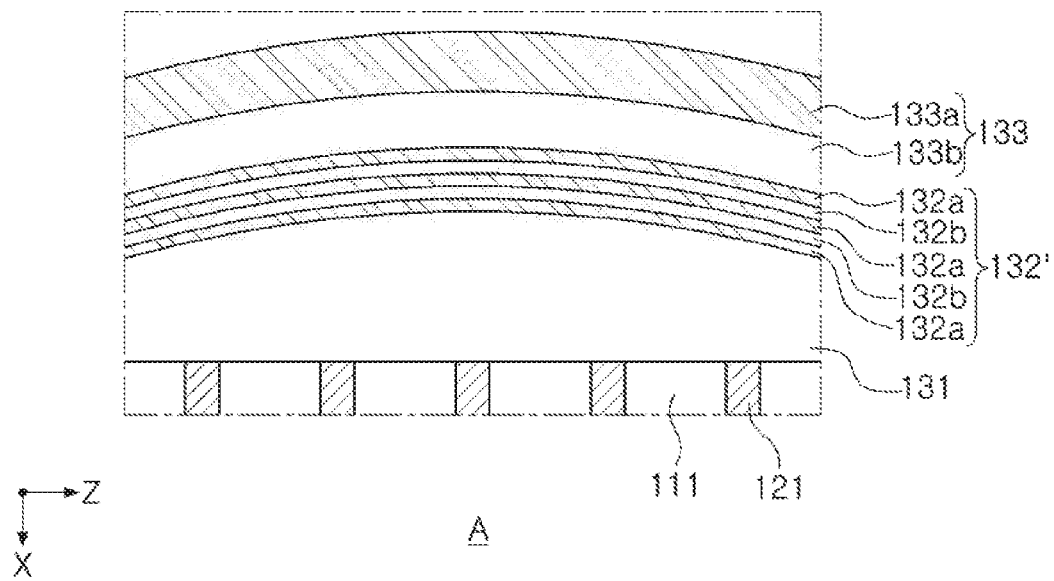
FIG. 5 is a magnified view of part A in FIG. 2 according to a second exemplary embodiment in the present disclosure.

As illustrated in FIG. 5, the first plating portion 132' may consist of a first Sn-plated layer 132a, a first Ni-plated layer 132b, a second Sn-plated layer 132a, a second Ni-plated layer 132b, and a third Sn-plated layer 132a sequentially disposed on the electrode layer.

The first plating portion 132 may be thinner than the second plating portion 133. When the first plating portion 132 is thicker than the second plating portion 133, the multilayer ceramic capacitor may have an increased, which may lead to a decline in capacity per unit volume.

Preferably, the thickness of the first plating portion 132 may be ½ or less of the thickness of the second plating portion 133.

The thickness of the Sn-plated layers 132a of the first plating portion may be within a range of 0.1 to 1 μm.

If the thickness of the Sn-plated layers 132a is lower than 0.1 μm, the continuity of the Sn-plated layer may be reduced, the Ni-plated layer on the Sn-plated layer may be discontinuous, and the effect of plating discontinuation prevention may be reduced.

When the Sn-plated layers 132a of the first plating portion is greater than 1 μm, Sn may agglomerate when the multilayer ceramic capacitor is joined to the substrate using a reflow soldering. When Sn agglomerates, a pore may be formed in the Sn-plated layer 132A of the first plating portion, and the pore may form a route for moisture penetration.

The thickness of the Ni-plated layer 132B of the first plating portion is not particularly limited, but may be within a range of 1 to 5 μm by considering the size of the body 110.

Table 1 below shows experimental data on plating discontinuation and Sn-plated agglomeration depending on the thickness of the Sn-plated layer and the Ni-plated layer.

A ceramic body was prepared. Paste including a Cu powder and glass was applied to both sides of the ceramic body in a length direction and sintered, and an electrode layer was formed. A first plating portion was formed by performing a first Sn plating process, a Ni plating process, and a second Sn plating process in order on the electrode layer such that a first Sn-plated layer, a Ni-plated layer, and a second Sn-plated layer achieved the thicknesses indicated in Table 1. A second plating portion was formed by plating Ni and Sn in order on the first plating portion to form a Ni-plated layer and a Sn-plated layer with the thicknesses indicated in Table 2. The multilayer ceramic capacitor was thus manufactured. In the case of experiment number 1, only the second plating portion was formed on the electrode layer without forming the first plating portion.

The occurrence rate of plating discontinuations was measured by analyzing a cross section of the first and second plating portions and determining whether the discontinuation occurred on the Ni-plated layer after the plating was completed on the basis of one hundred samples.

The defect rate of Sn plating agglomeration was measured by determining whether a pore was formed on the Sn-plated layer of the first plating portion after reflow on the basis of one hundred samples.

TABLE 1

| Classification | First plating portion | | | Second plating portion | | Defect rate of Sn plating agglomeration | Occurrence rate of plating discontinuation |
| | Thickness of first Sn-plated layer (μm) | Thickness of Ni-plated layer (μm) | Thickness of second Sn-plated layer (μm) | Thickness of Ni-plated layer (μm) | Thickness of Sn-plated layer (μm) | | |
|---|---|---|---|---|---|---|---|
| 1* | — | — | — | 3 | 5 | 0% | 40% |
| 2* | 1.4 | 3 | 0.5 | 3 | 5 | 54% | 0% |
| 3 | 0.8 | 3 | 0.5 | 3 | 5 | 0% | 0% |
| 4 | 0.5 | 3 | 0.8 | 3 | 5 | 0% | 0% |
| 5* | 0.5 | 3 | 1.5 | 3 | 5 | 77% | 0% |

In the case of experiment number 1, the occurrence rate of plating discontinuation was 40%, since the first plating portion was not formed. Accordingly, moisture resistance reliability was reduced.

Because the thickness of the first Sn-plated layer exceeded 1 μm in experiment number 2, and the thickness of the second Sn-plated layer exceeded 1 μm in experiment number 5, Sn agglomeration occurred during reflow.

However, because the thickness of the first and second Sn-plated layers were within a range of 0.1 to 1 μm in experiments 3 and 4, Sn agglomeration was not detected.

As described above, the first plating portion 132 and the second plating portion 133 may serve to prevent plating discontinuation, and the second plating portion 133 may correspond to a conventional plating layer. Thus, the second plating portion 133 may include the Ni-plated layer 133b and the Sn-plated layer 133a sequentially disposed on the first plating portion 132. The plating layer of the first plating portion that is in contact with the second plating portion 133 may be a Sn-plated layer. Accordingly, the first and last plating layers of the first plating portion 132 may be Sn-plated layers.

The thickness of the Ni-plated layer 133b of the second plating portion may be within a range of 1 to 10 μm, and the thickness of the Sn-plated layer 133a of the second plating portion may be within a range of 1 to 10 μm, but are not limited thereto. The thickness of the Ni-plated layer 133b and the Sn-plated layer 133a of the second plating portion may be selected depending on the size of a capacitor.

Third and fourth exemplary embodiments will be described in greater detail with reference to FIGS. 6 and 7. Descriptions that overlap the aforementioned descriptions will be omitted.

Figure 6:
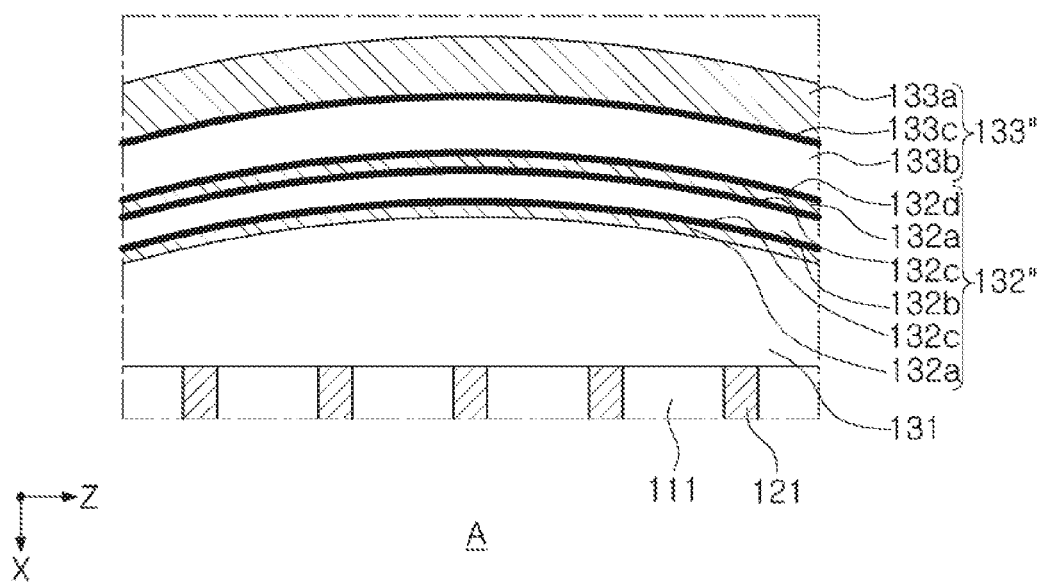
FIG. 6 is a magnified view of part A in FIG. 2 according to a third exemplary embodiment in the present disclosure.

FIG. 6 is a magnified view of part A in FIG. 2 according to third exemplary embodiment.

Referring to FIG. 6, according to third exemplary embodiment, the first plating portion 132" may include a plurality of plating layers in which the Sn-plated layer 132a and the Ni-plated layer 132b are alternately disposed, with an Sn—Ni intermetallic compound layer 132c disposed at the interfacial areas between the Sn-plated layers 132a and the Ni-plated layers 132b of the first plating portion.

The Sn—Ni intermetallic compound layer 132c may be formed with Sn and Ni interdiffused in the interfacial area between the Sn-plated layer 132a and the Ni-plated layer 132b during reflow.

The Sn—Ni intermetallic compound layer 132c may contain approximately 10 to 90 wt % of Sn and approximately 10 to 90 wt % of Ni.

When the second plating portion 133" includes a Ni-plated layer 133b and Sn-plated layer 133a sequentially disposed on the first plating portion, an Sn—Ni intermetallic compound layer 133c may also be disposed in the interfacial area between the Sn-plated layer 133a and the Ni-plated layer 133b of the second plating portion 133". In addition, a Sn—Ni intermetallic compound layer 132d may be disposed in the interfacial area between the first plating portion 132" and the second plating portion 133".

Figure 7:
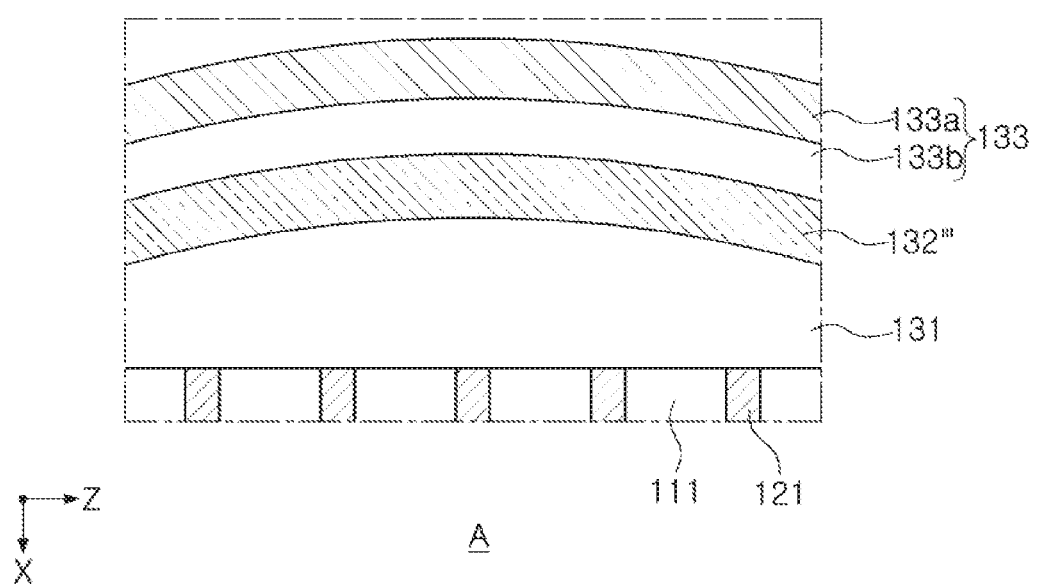
FIG. 7 is a magnified view of part A in FIG. 2 according to a fourth exemplary embodiment in the present disclosure.

FIG. 7 is a magnified view of part A in FIG. 2 according to the fourth exemplary embodiment.

Referring to FIG. 7, according to fourth exemplary embodiment, the first plating portion 132''' may include Sn, Ni, and an Sn—Ni intermetallic compound.

According to fourth exemplary embodiment, the first plating portion 132''' may be plated such that the Sn-plated layer and the Ni-plated layer are alternately disposed, and may be formed in a manner that, by interdiffusion of Sn and Ni through a heat treatment before the second plating portion is formed, the boundary of each plating layer is integrated such that it is difficult to identify the boundary and the Sn, Ni and Sn—Ni intermetallic compound are mixed.

According to the fourth exemplary embodiment, the second plating portion 133 may include the Ni-plated layer 133b and the Sn-plated layer 133a sequentially disposed on the first plating portion.

According to the fourth exemplary embodiment, the second plating portion may be formed such that a Sn—Ni intermetallic compound layer is formed at the interfacial area between the Sn-plated layer and the Ni-plated layer of the second plating portion, as in the second plating portion of the third exemplary embodiment, and such that a Sn—Ni intermetallic compound layer is formed at the interfacial area between the first plating portion and the second plating portion.

As set forth above, according to an exemplary embodiment, by disposing a first plating portion including a plurality of plating layers between an electrode layer and a second plating portion, plating discontinuation may be prevented, and accordingly, a multilayer ceramic capacitor having excellent moisture resistance reliability may be provided.

While the exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
   a body including a dielectric layer and an internal electrode; and
   an external electrode on the body,
   wherein the external electrode includes an electrode layer connected to the internal electrode, a first plating portion on the electrode layer, and a second plating portion on the first plating portion,
   wherein the first plating portion includes a plurality of plating layers, including a plurality of tin (Sn)-plated layers alternately stacked with one or more nickel (Ni)-plated layers, and
   wherein a first thickness of the first plating portion is less than a second thickness of the second plating portion.

2. The multilayer ceramic capacitor of claim 1, wherein a first plating layer, of the plurality of plating layers of the first plating portion, is in contact with the electrode layer and is one of the plurality of Sn-plated layers.

3. The multilayer ceramic capacitor of claim 1, wherein the first plating portion comprises, in order, a first Sn-plated layer on the electrode layer, a Ni-plated layer, and a second Sn-plated layer.

4. The multilayer ceramic capacitor of claim 1, wherein the first thickness of the first plating portion is ½ or less of the second thickness of the second plating portion.

5. The multilayer ceramic capacitor of claim 1, wherein a thickness of a Sn-plated layer of the first plating portion is within a range of 0.1 to 1 µm.

6. The multilayer ceramic capacitor of claim 1, wherein the second plating portion comprises, in order, an Ni-plated layer on the first plating portion and an Sn-plated layer.

7. The multilayer ceramic capacitor of claim 6, wherein a third thickness of the Ni-plated layer of the second plating portion is within a range of 1 to 10 µm, and a fourth thickness of the Sn-plated layer of the second plating portion is within a range of 1 to 10 µm.

8. The multilayer ceramic capacitor of claim 1, wherein the electrode layer is a sintered electrode including a conductive metal and glass.

9. The multilayer ceramic capacitor of claim 1,
   wherein the internal electrode comprises first and second internal electrodes alternately stacked with dielectric layers interposed therebetween, and
   wherein the external electrode comprises first and second external electrodes respectively connected to the first and second internal electrodes.

10. A multilayer ceramic capacitor comprising:
    a body including a dielectric layer and an internal electrode; and
    an external electrode on the body,
    wherein the external electrode includes an electrode layer contacting the internal electrode, a first plating portion on the electrode layer, and a second plating portion on the first plating portion,
    wherein the first plating portion includes a plurality of plating layers, including a plurality of tin (Sn)-plated layers alternately stacked with one or more nickel (Ni)-plated layers, and
    wherein tin-nickel (Sn—Ni) intermetallic compound layers are at respective interfacial areas between the tin (Sn)-plated layers and the nickel (Ni)-plated layers of the first plating portion.

11. The multilayer ceramic capacitor of claim 10, wherein a first thickness of the first plating portion is less than a second thickness of the second plating portion.

12. The multilayer ceramic capacitor of claim 10, wherein a first thickness of the first plating portion is ½ or less of a second thickness of the second plating portion.

13. The multilayer ceramic capacitor of claim 10, wherein the Sn—Ni intermetallic compound layers each comprise 10 to 90 wt % of Sn and 10 to 90 wt % of Ni.

14. The multilayer ceramic capacitor of claim 10,
    wherein the second plating portion comprises, in order, an Ni-plated layer on the first plating portion, a first Sn—Ni intermetallic compound layer, and an Sn-plated layer, and
    wherein a second Sn—Ni intermetallic compound layer is at an interfacial area between the first plating portion and the second plating portion.

15. A multilayer ceramic capacitor comprising:
    a body including a dielectric layer and an internal electrode; and
    an external electrode on the body, including an electrode layer in contact with the internal electrode, a first plating portion on the electrode layer and including a mixture of Sn, Ni, and an Sn—Ni intermetallic compound, and a second plating portion on the first plating portion.

16. The multilayer ceramic capacitor of claim 15, wherein the Sn—Ni intermetallic compound comprises 10 to 90 wt % of Sn and 10 to 90 wt % of Ni.

17. The multilayer ceramic capacitor of claim 15, wherein the second plating portion comprises, in order, an Ni-plated layer on the first plating portion and an Sn-plated layer.

18. The multilayer ceramic capacitor of claim 17,
    wherein a first Sn—Ni intermetallic compound layer is at a first interfacial area between the Sn—plated layer and the Ni-plated layer of the second plating portion, and
    wherein a second Sn—Ni intermetallic compound layer is at a second interfacial area between the first plating portion and the second plating portion.

19. A multilayer ceramic capacitor, comprising:
    a body, including a plurality of first internal electrodes, extending to a first side surface of the body parallel to a stacking direction, alternately stacked with a plurality of second internal electrode layers, extending to a second side surface of the body parallel to the stacking direction and opposing the first side surface, with dielectric layers interposed therebetween;
    a first external electrode electrically connected to the first internal electrodes and including a first electrode layer on the first surface of the body, a first inner plating layer on the first electrode layer, and a first outer plating layer on the first inner plating layer; and
    a second external electrode electrically connected to the second internal electrodes and including a second electrode layer on the second surface of the body, a second inner plating layer on the second electrode layer, and a second outer plating layer on the second inner plating layer, wherein the first and second inner plating layers each include a first tin layer on the first electrode layer, a first nickel layer over the first tin layer, and a second tin layer over the first nickel layer, wherein the first and second outer plating layers each include a second nickel layer over the inner plating layer and a third tin layer over the second nickel layer, and wherein a first thickness of the first or second inner plating layer is less than a second thickness of the first or second outer plating layer.

20. The multilayer ceramic capacitor of claim 19,
wherein the first thickness of the first or second inner plating layer is less than or equal to half the second thickness of the first or second outer plating layer, and
the first and second tin layers of the first or second inner plating layer each have thicknesses within a range of 0.1 to 1 μm.

21. The multilayer ceramic capacitor of claim 19, wherein the first and second inner plating layers each include two or more nickel layers alternately stacked with three or more tin layers.

22. The multilayer ceramic capacitor of claim 19,
wherein the first and second inner plating layers each further include a first Sn—Ni intermetallic compound layer between the first tin layer and the first nickel layer and a second Sn—Ni intermetallic compound layer between the first nickel layer and the second tin layer,
wherein the first and second outer plating layers each further include a third Sn—Ni intermetallic compound layer between the second nickel layer and the third tin layer, and
wherein the first and second external electrodes each further include a fourth Sn—Ni intermetallic compound layer between the inner plating layer and the outer plating layer.

23. A multilayer ceramic capacitor, comprising:
a body, including a plurality of first internal electrodes, extending to a first side surface of the body parallel to a stacking direction, alternately stacked with a plurality of second internal electrode layers, extending to a second side surface of the body parallel to the stacking direction and opposing the first side surface, with dielectric layers interposed therebetween;

a first external electrode electrically connected to the first internal electrodes and including a first electrode layer on the first surface of the body, a first tin-nickel intermetallic compound layer on the first electrode layer, and a first outer plating layer on the first tin-nickel intermetallic compound layer; and a second external electrode electrically connected to the second internal electrodes and including a second electrode layer on the second surface of the body, a second tin-nickel intermetallic compound layer on the second electrode layer, and a second outer plating layer on the second tin-nickel intermetallic compound layer, wherein the first and second outer plating layers each include a nickel layer and a tin layer over the nickel layer.

24. A multilayer ceramic capacitor, comprising:
a body; and
an external electrode on the body, comprising a first electrode layer on a surface of the body and including a first conductive metal, a first plating layer on the first electrode layer and including a second conductive metal and a third conductive metal, and a second plating layer on the first plating layer and comprising a first layer of the third conductive metal and a second layer of the second conductive metal,
wherein the first, second, and third conductive metals are each different materials,
wherein the second conductive metal is tin, and
wherein a first thickness of the first plating layer is less than a second thickness of the second plating layer.

25. The multilayer ceramic capacitor of claim 24, wherein the first conductive metal is copper and the third conductive metal is nickel.

26. The multilayer ceramic capacitor of claim 25, wherein the first plating layer including the second conductive metal and the third conductive metal comprises a intermetallic compound layer where the first and second conductive metals are mixed.

* * * * *